United States Patent [19]
Probst

[11] Patent Number: 5,531,157
[45] Date of Patent: Jul. 2, 1996

[54] STERILIZATION AND HOMOGENIZATION OF FLUID SUBSTANCES BY HIGH FREQUECY VIBRATION

[75] Inventor: Gastone Probst, Viganello, Switzerland

[73] Assignee: Ixtlan Aktiengesellschaft, Triesen, Liechtenstein

[21] Appl. No.: 277,635

[22] Filed: Jul. 20, 1994

[30] Foreign Application Priority Data

Jun. 30, 1994 [CH] Switzerland .................. 02078/94

[51] Int. Cl.⁶ .................. A23C 9/00; A23L 3/32; B01F 11/00
[52] U.S. Cl. .................. 99/451; 99/452; 99/455; 366/124; 366/127; 366/144
[58] Field of Search .................. 99/451, 452–456, 99/483, 516, 348; 366/127, 124, 18, 293, 114, 144, 108, 118; 422/128, 129, 20

[56] References Cited

U.S. PATENT DOCUMENTS

| | | | |
|---|---|---|---|
| 3,743,523 | 7/1973 | Bodine | 366/108 |
| 3,771,434 | 11/1973 | Davies | 99/454 |
| 3,896,716 | 7/1975 | Carasso | 99/452 |
| 3,997,145 | 12/1976 | Benson | 366/114 |
| 4,141,655 | 2/1979 | te Riele | 366/118 |
| 4,160,002 | 7/1979 | Janovtchik | 99/453 |
| 4,667,699 | 5/1987 | Loliger | 99/452 |
| 4,738,302 | 4/1988 | Abma | 99/455 |
| 4,838,154 | 6/1989 | Dunn et al. | 99/451 |
| 5,105,724 | 4/1992 | Swartzel et al. | 99/453 |
| 5,235,905 | 8/1993 | Bushnell et al. | 99/483 |
| 5,395,592 | 3/1995 | Bolleman et al. | 422/128 |

Primary Examiner—Timothy F. Simone
Attorney, Agent, or Firm—Young & Thompson

[57] ABSTRACT

In a process for sterilization and homogenization of a liquid or fluid, these operations are carried out by subjecting the liquid or fluid to ultrasonic frequency vibrations for a predetermined period of time. In a device for carrying out the process, the liquid taken in from a tank (10) is sent by a pump (11) to a chamber (1), inside of which or in proximity to which is arranged a sonotrode (5) connected to a converter-generator (14). As it travels through this chamber (1), the liquid is subjected to vibrations and is sterilized or homogenized.

10 Claims, 7 Drawing Sheets

STERILIZATION AND HOMOGENIZATION OF FLUID SUBSTANCES BY HIGH FREQUECY VIBRATION

BACKGROUND OF THE INVENTION

1. Field of the Invention

This invention relates to the area of processes for the sterilization and/or homogenization of liquid substances and fluid substances of low or medium viscosity.

2. Description of the Related Art

At the present time, these processes are largely based on thermal and mechanical effects produced by treatments to which the liquids or fluids are subjected. One notable example which covers all the most salient characteristic problems and aspects of these treatments is the process of sterilization and homogenization of milk for human consumption.

For homogenization, it is necessary to reduce the maximum volume of the fat particles contained therein. This is currently done by thermal action, combined with a predominant mechanical action which is performed by ejecting milk which has been subjected to very high pressures, on the order of $170 \times 10^2$ kPa, into suitable porous or perforated units. Due to the considerable turbulence and mixing of the milk fat particles during their passage through said units, the particles break down into subparticles with maximum dimensions which are defined as acceptable by the standards of individual countries. All this requires a major expenditure of energy and the building of fairly expensive plants.

The sterilization of milk, on the other hand, can only be done by heating it at certain temperatures for predetermined periods of time, either in the pasteurization process, at lower temperatures, or in the ultrapurification process, at higher temperatures.

In some cases, moreover, the thermal sterilization treatment must always be repeated after the milk is put into its containers for consumption.

Considering that the temperatures, in the case of the two treatments mentioned above, vary approximately between 100° and 150° C., it is a natural conclusion that these treatments significantly reduce the nutritional value of various components of the milk.

It should be pointed out that experiments have in fact confirmed that in the aforementioned temperature range, there is a substantial decrease in the contents of vitamins B1, B6, B12 and C, as well as amino acids and unsaturated fatty acids, including linoleic acid, which of course are critical for proper human metabolism.

The intent of the inventor was to solve the aforementioned types of problems which, although having different specific aspects, also arise in sterilization and/or homogenization treatments of other types of fluids, for example water, beverages such as soft drinks, fruit juices, or even, for other purposes, dirty water with a high bacterial content, for example waste water from hospitals, purifiers, etc.

SUMMARY OF THE INVENTION

The inventor proposes a process which makes it possible to attain, for all these different cases, the desired result of sterilization and/or homogenization without having to resort to the use of high temperatures or high pressures or the inevitably necessary expensive equipment for producing said effects.

He has in fact solved the problem of sterilization and homogenization by subjecting the liquids or fluids to be treated to high-frequency vibrations, with predetermined times and modalities.

BRIEF DESCRIPION OF THE DRAWINGS

The process and some preferred embodiments of a device that is suitable for carrying out the process follow which will be described in greater detail below, with reference to the attached drawings, where:

DETAILED DESCRIPTION OF THE EMBODIMENTS

The inventor has ascertained in experiments that, by subjecting a liquid with a certain bacterial content to high-frequency vibrations (for example, at a frequency of roughly 20 kHz) for a predetermined period of time, the resulting bacterial content is essentially eliminated at the end of the treatment. This effect is due in part to the mechanical action of rupturing the cell membrane, caused by cavitation phenomena induced by vibrations, phenomena which include point superheating on the order of 5000° C. and overpressures of up to $500 \times 10^{-2}$ kPa (500 bar) in microspheric cavitation bubbles, and in part to dispersion of bacteria into disagglutinated entities with a low population, something which for many species of bacteria prevents their reproduction.

In similar experiments aimed at homogenizing liquids containing low-viscosity particles in an emulsion, the inventor has determined that high-frequency vibrations cause a rapid and effective subdivision of these particles into parts with reduced dimensions whose sizes are more than sufficient to ensure that the emulsion can be defined as "homogenized" as per the current state of the art.

For this he has developed the process which is the object of this invention, which can be, as already pointed out, used in a number of situations of considerable importance to society, and with lower expenditure of energy than has been needed to date for various treatments which accomplish this purpose.

Figure 3:
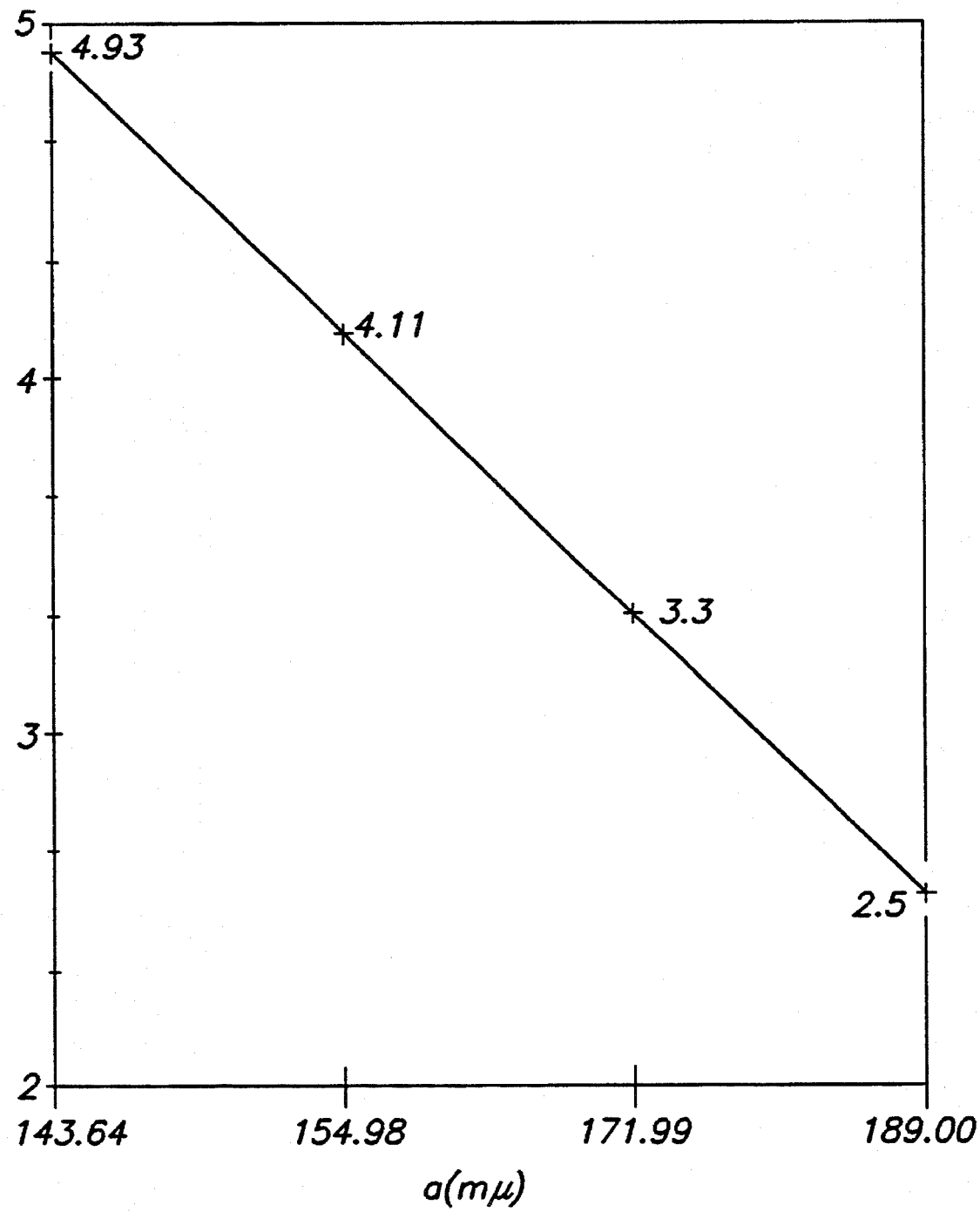
FIG. 3 shows the plot of the logarithmic curve of milk sterilization values that can be obtained as a function of a vibration amplitude of the sonotrode.

One experimental example selected for its particular importance is that of milk for natural nutrition: with a treatment based on high-frequency vibrations, it has been found that, when the power used is increased and consequently the amplitude of the vibrations produced by a generator-converter is increased, progressively better results are obtained both in the homogenization index (0% in FIG. 4) and in the degree of sterilization (logb in FIG. 3). Logb indicates the value of the logarithm of the total number of germs remaining in one milliliter of milk.

Figure 5:
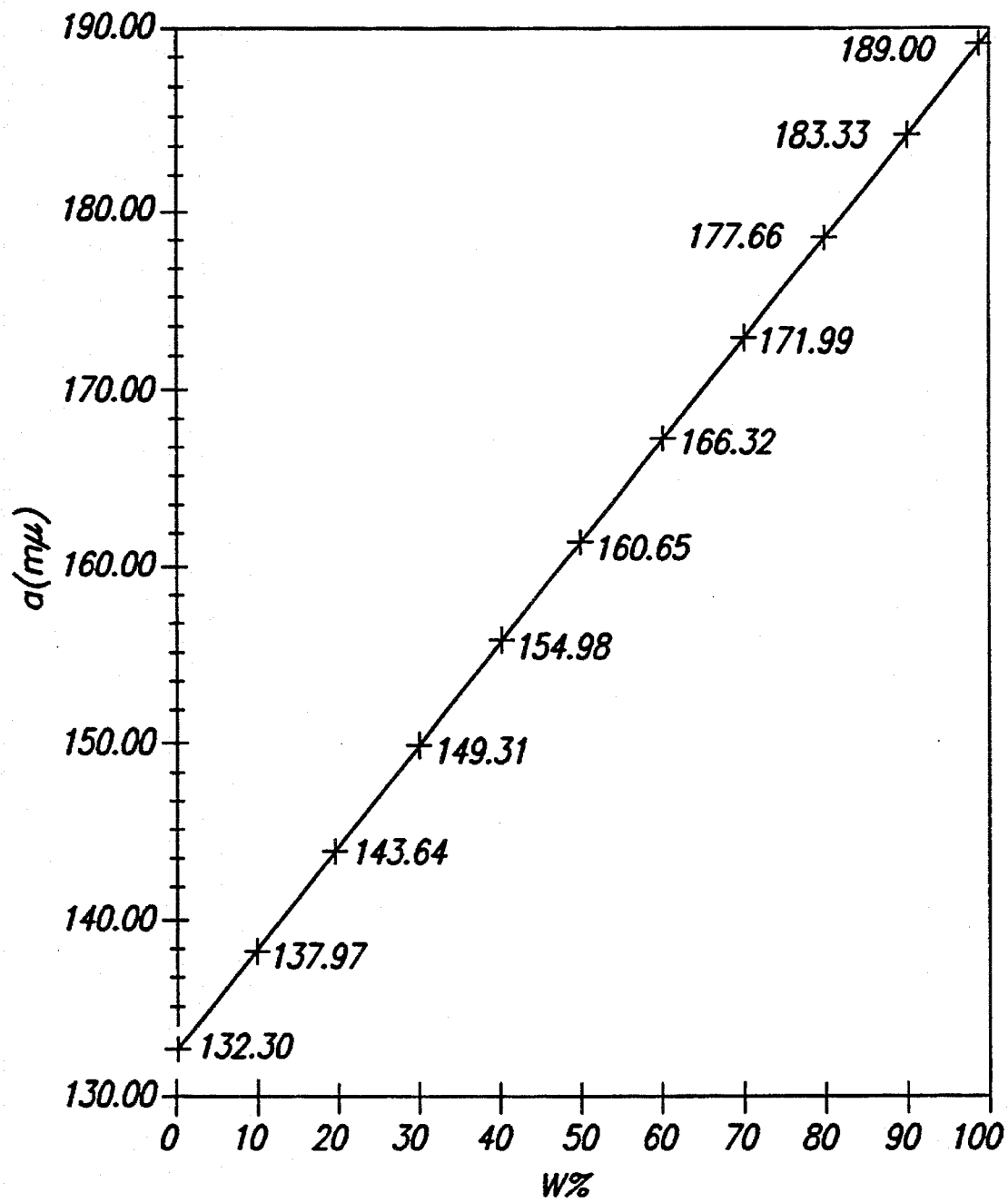
FIG. 5 shows the curve of vibration amplitude as a function of the percentage of power in the sonotrode used in the test.

The graph in FIG. 5 shows the curve of vibration amplitude a as a function of the percentage of power W% used in the described device.

As is clear from the graphs, even at 70% power residual bacterial content levels are reached which are lower than those established by, for example Swiss standards for pasteurized milk and, extrapolating the sterilization curve to maximum power (100%), a bacterial content of virtually "0" is obtained. This extrapolation is not included in the graph since it had not yet been possible to carry out tests at 100% power due to cavitation problems of the material (titanium) of which the vibrating terminal part of the sonotrode used as a vibration generating unit was made. These problems were subsequently solved.

Figure 4:
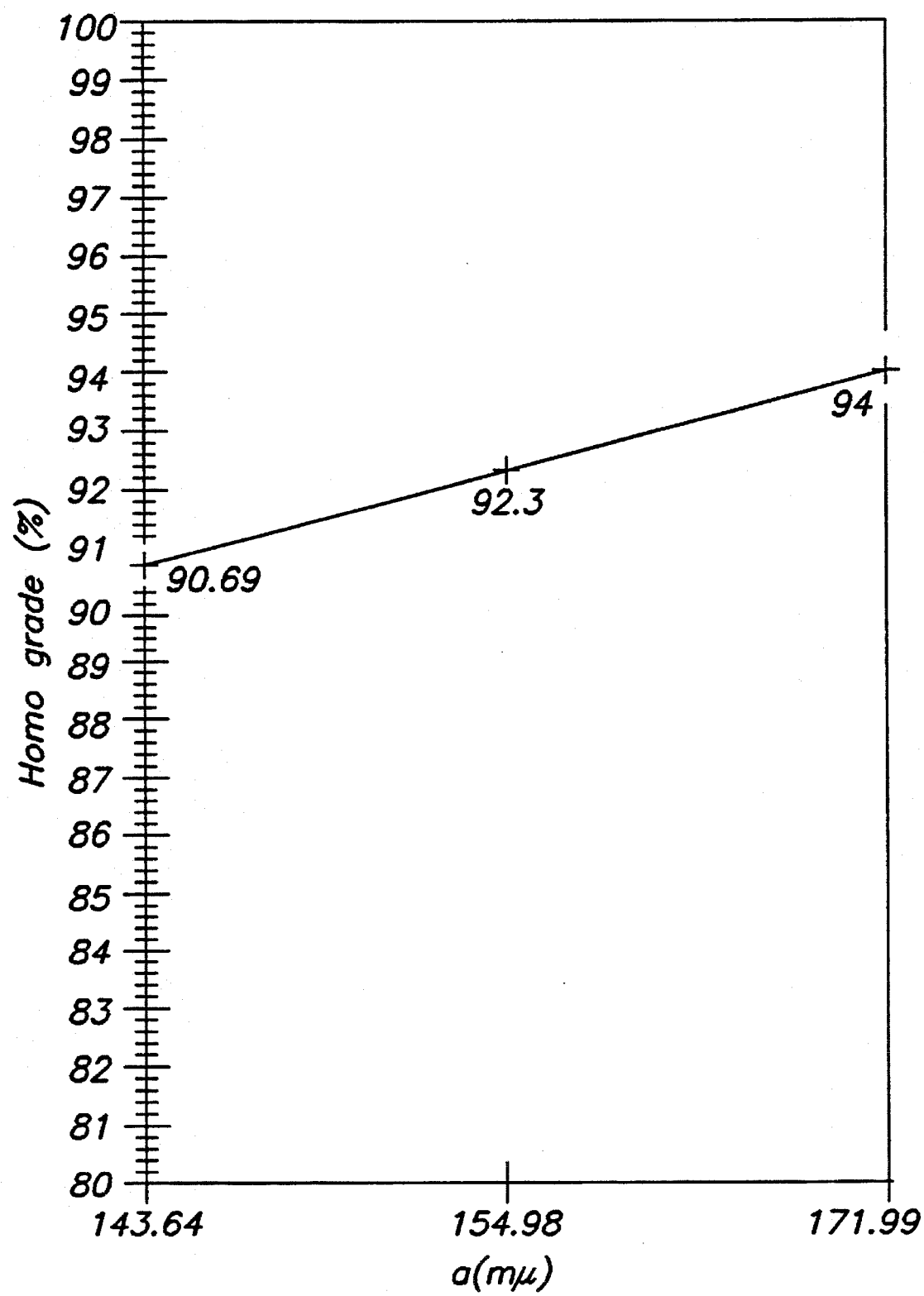
FIG. 4 shows the plot of the 0% degree of homogenization which can be obtained for milk as a function of the aforementioned vibration amplitude of the sonotrode.

Similar favorable results were obtained for homogenization: as can be deduced from the graph in FIG. 4, at 70% power a homogenization index equal to 94% is reached.

As can be observed from FIGS. 3 and 4, the amplitudes of vibrations used in the experiments (for small ranges, equal to 6:20/h) are between 143.64 and 189 m. The energy involved for these ranges was verified to be only 300 Whr.

It can therefore be asserted that the process according to the invention attains the result proposed by the inventor, namely, to achieve optimum homogenization and sterilization results in, for example, milk, without having to subject it to thermal stress and without having to resort to costly equipment.

The pressure at which the liquid was maintained in order to suppress the erosion phenomena induced by cavitation in parts of the device for carrying out the process which will be described below was only $4 \times 10^{-2}$ kPa (4 bar), and the temperature of the milk, throughout the course of the process, did not exceed 49° C. It can easily be concluded, and subsequent analyses have confirmed, that the milk thereby processed does not differ significantly in its organic and nutritional value from freshly expressed milk.

Figure 1:
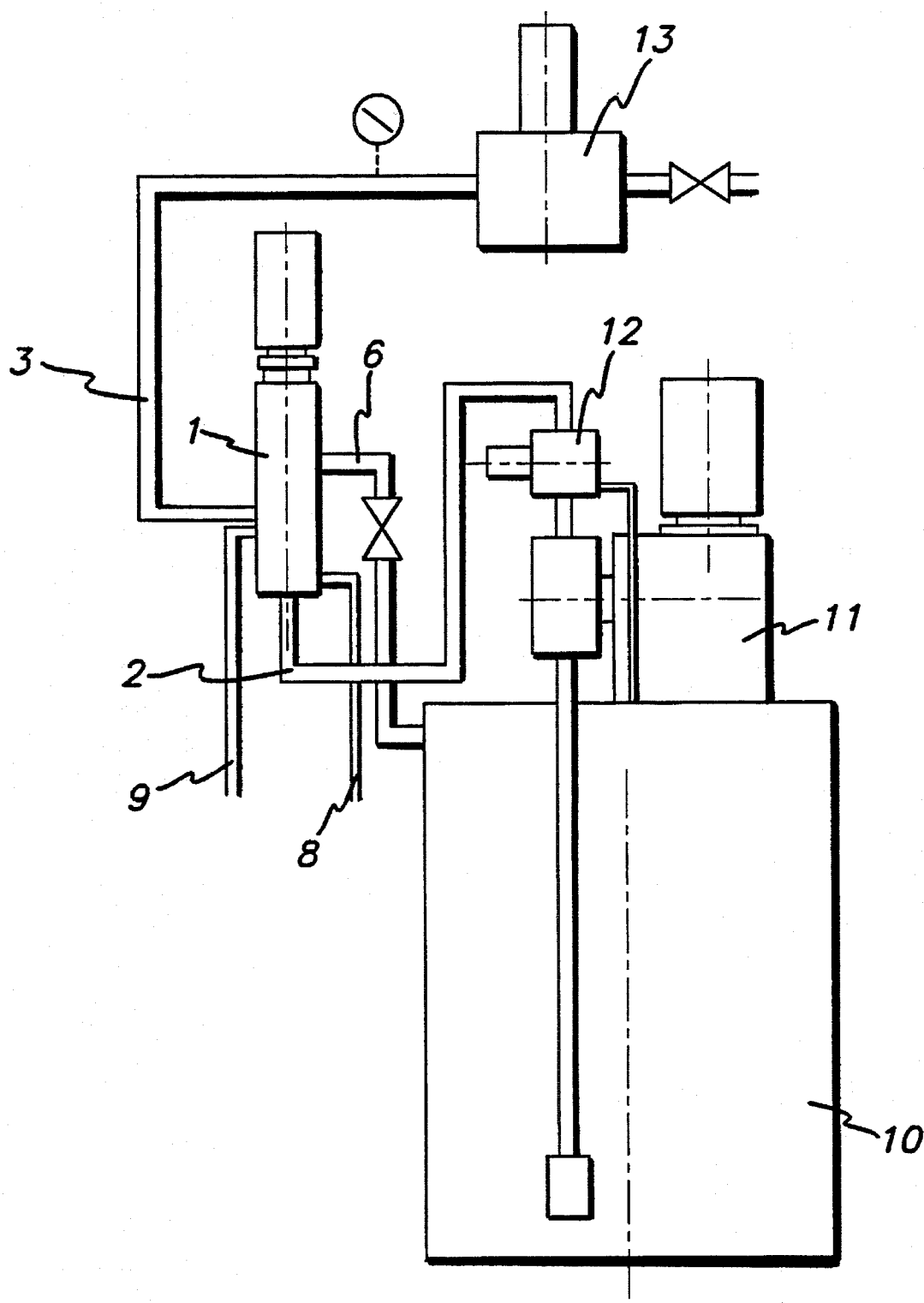
FIG. 1 shows a front view of the preferred embodiment of a device suitable for carrying out the process according to the invention.
Figure 2:
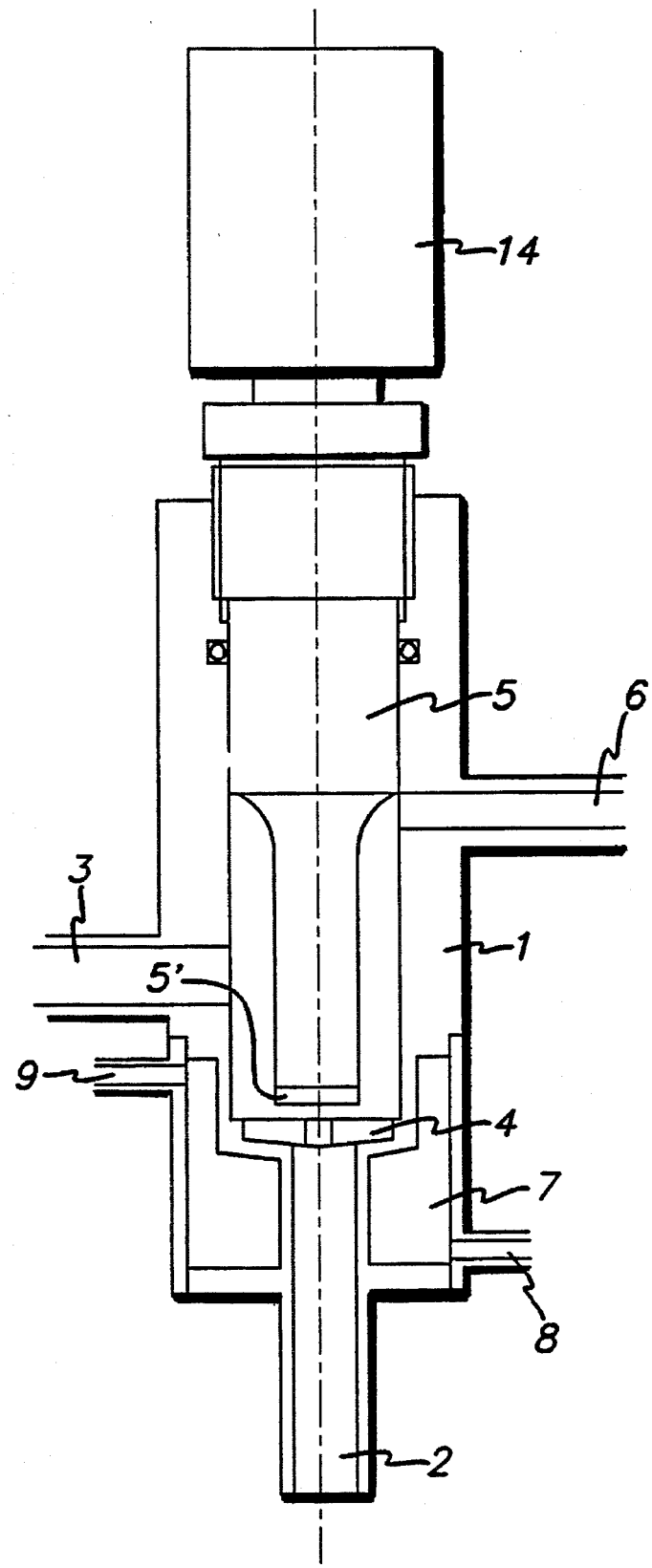
FIG. 2 shows a close-up view of the longitudinal cross-section of one part of the device as per FIG. 1 containing a sonotrode.

One example of a device configured to carry out the process is shown in FIG. 1: Pump 11 takes in the liquid (in this particular case, milk) from tank 10 and sends it through inlet pipe 2 into a chamber 1, in which a vibration generating unit known as a sonotrode 5 is coaxially arranged (in FIG. 2) and directly connected to a generator-converter 14 without insertion of a booster (which should be added in some cases for high powers). The milk leaves inlet pipe 2 (in FIG. 2) through conveyor nozzle 4 so as to be directed to terminal part 5' of sonotrode 5 and so that, when subsequently traversing output pipe 3 of chamber 1, it passes in back of the external vibrating walls of said sonotrode 5. Regulating the range of pump 11 with a suitable regulator 12 to obtain the desired speed at which the fluid will traverse the chamber 1 ensures that the duration of treatment with high-frequency vibrations is sufficient to guarantee the desired results.

Overflow discharge pipe 6 ensures moreover that any excess liquid which may be sent by pump 11 will be returned to tank 10. The treated liquid, on the other hand, travels from output pipe 3 into a collection container 13.

To keep the temperature of the treated fluid, which tends to rise in proximity to terminal part 5' of sonotrode 5, within predetermined limits (in the case of milk, 45°–49° C.), there is around at least one part of chamber 1 an annular cooling jacket 7 for circulating fluid, which reaches the jacket 7 and leaves through two exit pipes 8, 9, respectively.

In other cases where neither a high degree of sterilization nor a particularly high homogenization index is desired (for example, in a treatment which is aimed only at decreasing bacterial content in hospital waste) and where, for reasons of corrosion, direct contact between the sonotrode 5 and the fluid to be treated is not advisable, there can be inserted between them, for example, an annular hollow member containing a fluid which surrounds the outside of the chamber 1 involved in the treatment; said fluid is subjected to vibration by the sonotrode 5, retransmits the vibrations in turn to the chamber 1 and then, finally, to the liquid contained therein (this case not shown).

The inventor, in the course of experimentation, ascertained that the phenomenon of cavitation, which is useful for obtaining the desired effects on the fluid to be treated, has an adverse effect on the durability of the sonotrode 5, or rather, on its vibrating terminal part 5'.

Based on his experience, as well as theoretical studies by other researchers, he has provided some innovative technical solutions which make it possible to prolong the durability of the sonotrode 5 and minimize the introduction of foreign particles produced by the effect of cavitational erosion on the sonotrode 5 into the liquid to be treated.

Figure 6A:
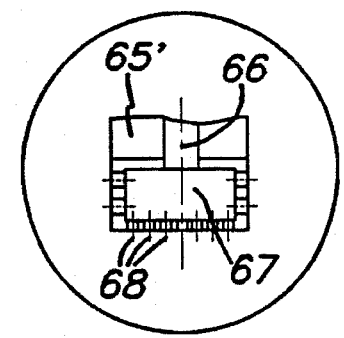
FIG. 6a shows a close-up view of the terminal part of the sonotrode in FIG. 6b.
Figure 6B:
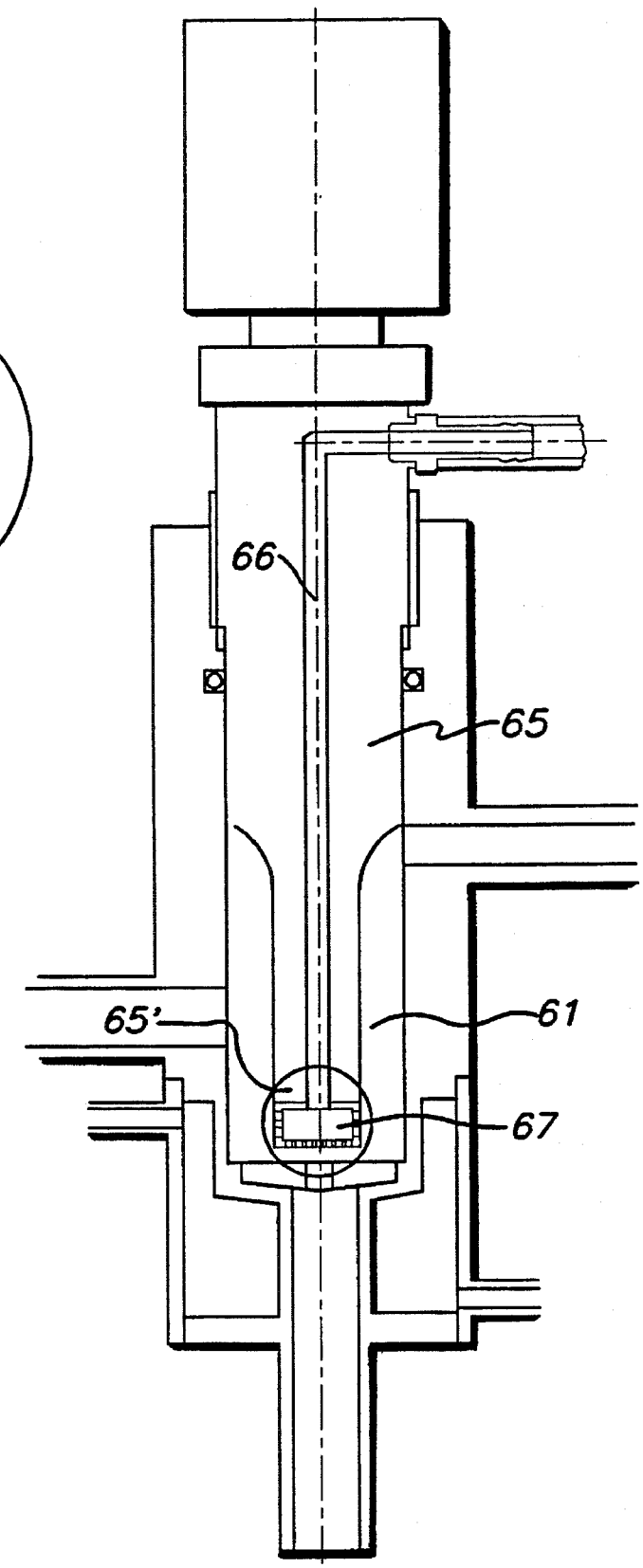
FIG. 6b shows a view of a particular sonotrode which is protected from cavitation by the forced discharge of inert gas connected to its terminal part.

One of these solutions is shown in FIGS. 6a and 6b: in a sonotrode 65 arranged in a chamber 61, there are hollowed-out channels 68i, shown in FIG. 6a, branching out from one main channel 66 arranged axially, through which an inert gas, for example nitrogen, is caused to flow at a predetermined pressure. This gas, on leaving the outlet mouths of the channels 68i which open out into a terminal part 65' of the sonotrode 65, or preferably, as shown, into the external walls of a suitable cell 67 which is rigidly attached to said terminal part 65', creates an interface zone between the sonotrode 65 and the fluid to be treated in which a high turbulence is generated (also dependent on the outgoing overpressure of the gas). This area develops an effective dampening effect and thus a reduction in the cavitational erosion which damages the sonotrode 65. The gas can then be recovered and re-used after proper treatment.

Another solution takes advantage of the particular behavior of high-frequency acoustic waves of relatively low wavelength, which naturally, due to their physical characteristics, behave in a manner similar to that of light rays, obeying known laws of geometric optics.

Figure 7:
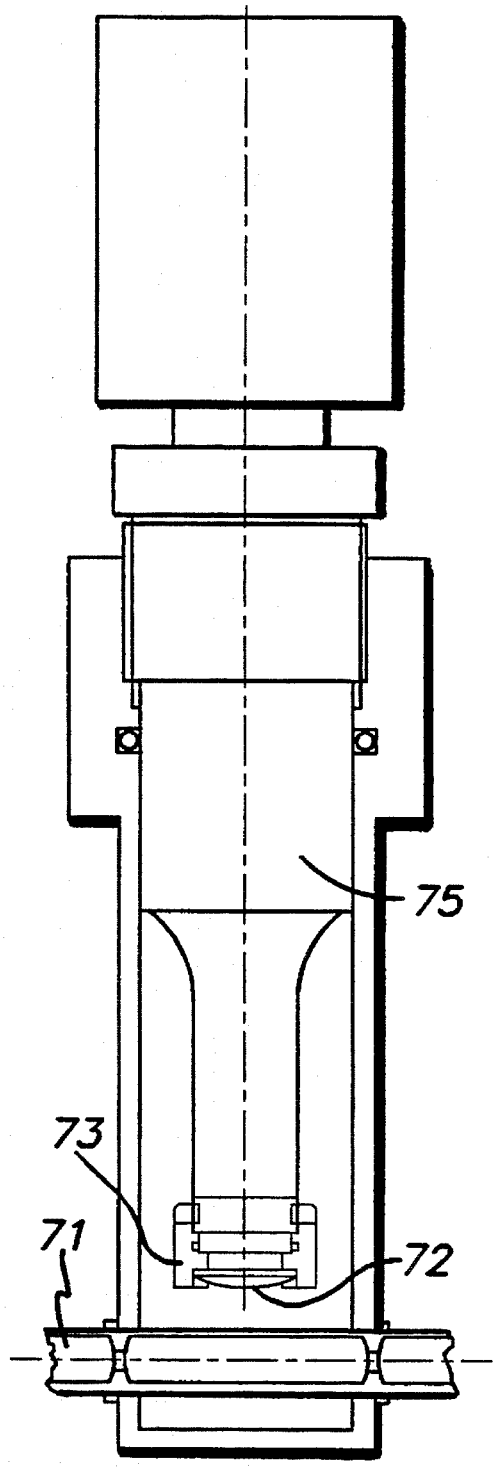
FIG. 7 shows a cross-sectional view of an embodiment in which the ultrasonic waves are concentrated and focused on the fluid to be treated.
Figure 8:
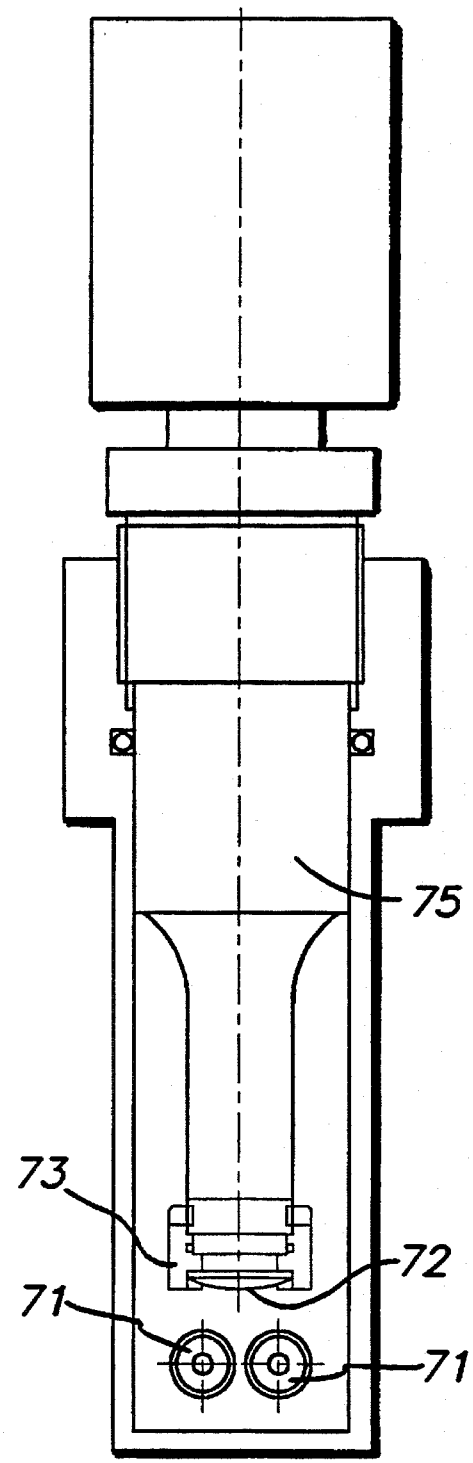
FIG. 8 shows a cross-sectional view of the embodiment in FIG. 7 in a plane that is perpendicular to the plane of the cross-section in FIG. 7.

Using this fact as a foundation, the inventor built a device in which the pipe length in which the fluid to be treated is subjected to ultrasonic vibration consists of a bundle of parallel tubes 71 (two in FIGS. 7 and 8) through which this fluid moves and in which a system of lenses 72, which are mounted facing the numbered terminal part of a sonotrode 75' concentrate the ultrasonic waves emitted by the sonotrode 75 by focussing them.

The aforementioned lenses 72 are moreover attached to a base 73 which is able to transfer the waves by varying the focal distance with respect to the sonotrode 75 according to requirements.

These tubes 71 which form the aforementioned bundle should preferably be made of a material which has a low coefficient of absorption of the elastic waves which are generated therein as the result of exposure to ultrasound.

This prevents the sonotrode 75 from coming into contact with the fluid to be treated, and consequently some emissions of extraneous particles into this fluid are avoided.

The materials most suitable for construction of the sonotrodes (5,65,75) associated with the device according to the invention are those already known to those skilled in the art, and preferably metals with a high resistance to cavitation erosion.

In order to further increase this resistance, the inventor suitably modified the crystalline structure of the terminal part (5',65') of the sonotrode (5,65,75) using ion implantation of an element different from that which composes the sonotrode (5,65,75), chosen for example from among nitrogen, carbon, titanium, nickel, molybdenum, cobalt and fluorine.

Downstream of the chamber (1,61) in which the fluid is subjected to ultrasonic vibrations, independently of the mode of treatment selected, but in particular when the sonotrode (5,65,75) is in contact with the fluid to be treated, the inventor installed a filtering element (not shown) whose sterile filter catches any foreign particles and/or impurities.

Any variations which could be made by one skilled in the art either to the process which is the object of this invention or to the embodiments thereof, and not restricted to the device as it is described, and which do not depart from the scope of these claims, will be considered as being covered by the protection conferred by this patent.

I claim:

1. Device for sterilization and homogenization of a liquid or a fluid of low or medium viscosity, comprising:

a tank (10);

a pump means (11) for taking in the liquid or fluid from the tank (10) and sending it out;

an inlet pipe (2) connected to the pump means (11);

a chamber means (1), connected to the inlet pipe (2), for receiving the liquid or fluid;

a means (5), installed inside of the chamber means (1), for transferring high-frequency vibrations to the liquid or fluid;

an outlet pipe (3) for the liquid or fluid circulating inside of the chamber means (1);

a high-frequency vibration converter-generator (14) arranged coaxially with said transferring means (5); and a collection container (13) into which the liquid or fluid continues from the outlet pipe (3).

2. Device according to claim 1, wherein the inlet pipe (2) for the fluid or liquid has a longitudinal axis arranged on the extension of the longitudinal axis of the transferring means (5), and discharges facing a terminal part (5'), independent of the latter, while said outlet pipe (3) discharges from said chamber means (1) close to a central part of said chamber means (1).

3. Device according to claim 2, wherein around at least one part of said chamber means (1), there is an annular cooling jacket means (7) for circulating fluid.

4. Device according to claim 2, wherein said chamber means (1) also has an overflow discharge pipe (6) which returns excess liquid or fluid to said tank (10).

5. Device according to claim 1, wherein said chamber means (1) is surrounded on the outside by an annular wall member.

6. Device according to claim 2, wherein said transferring means (5) is a sonotrode (65) whose terminal part (65') is traversed by one or more channels (68i) flowing out into chamber means (61) through which inert gas is caused to flow at a predetermined pressure.

7. Device according to claim 2, wherein said chamber means includes a bundle of tubes (71) traversed by the fluid to be treated, and the transferring means (5) is a sonotrode (75), facing the terminal part on which are mounted one or more lenses (72) which are able to concentrate ultrasonic waves from said sonotrode (75), focusing them on the bundle of tubes (71).

8. Device according to claim 7, wherein said lenses (72) are attached to a base (73) which is able to transfer the ultrasonic waves by varying the focal distance of the lenses (72) with respect to the sonotrode (75).

9. Device according to claim 6, wherein the sonotrode (65) is made of metal and its terminal part (65') is treated, using ion implantation, with a chemical element different from the metal which composes the sonotrode (65).

10. Device according to claim 1, further comprising:

a filtering element located downstream of the outlet pipe (3).

* * * * *